United States Patent [19]

Man

[11] 4,043,915
[45] Aug. 23, 1977

[54] FILTER FOR USE WITH IRRIGATION SYSTEMS

[76] Inventor: Nahum Man, Kibbutz Merhavia, Merhavia, Israel

[21] Appl. No.: 759,622

[22] Filed: Jan. 17, 1977

[30] Foreign Application Priority Data

Jan. 30, 1976  Israel ................................ 48942

[51] Int. Cl.² ............................................. B01D 21/24
[52] U.S. Cl. ................................ 210/195 R; 210/307;
210/308; 210/312; 210/433 R
[58] Field of Search ...................... 210/79, 195 R, 197,
210/307, 308, 312, 313, 332, 433 R, 434

[56] References Cited

U.S. PATENT DOCUMENTS

| 3,143,499 | 8/1964 | Miller | 210/308 |
| 3,267,649 | 8/1966 | Vicard | 210/433 R X |
| 3,353,678 | 11/1967 | Dragon | 210/433 R X |

*Primary Examiner*—Frank A. Spear, Jr.
*Assistant Examiner*—Richard W. Burks
*Attorney, Agent, or Firm*—Browdy and Neimark

[57] ABSTRACT

A filter used in irrigation systems comprises a hollow screening and filtering body with inlet and outlet ports. A Venturi pipe is connected with the interior of said body. The screening and filtering body is placed in a casing which has an outlet. A conduit leads from the interior of the screening and filtering body into a container. From the interior of that container a further conduit leads to a point substantially co-incident with the throat of the Venturi pipe. The said further conduit is closed at its end positioned within the container. That portion of the said further conduit which extends within the container is permeable to liquid. The container has a flushing inlet and a flushing outlet.

2 Claims, 1 Drawing Figure

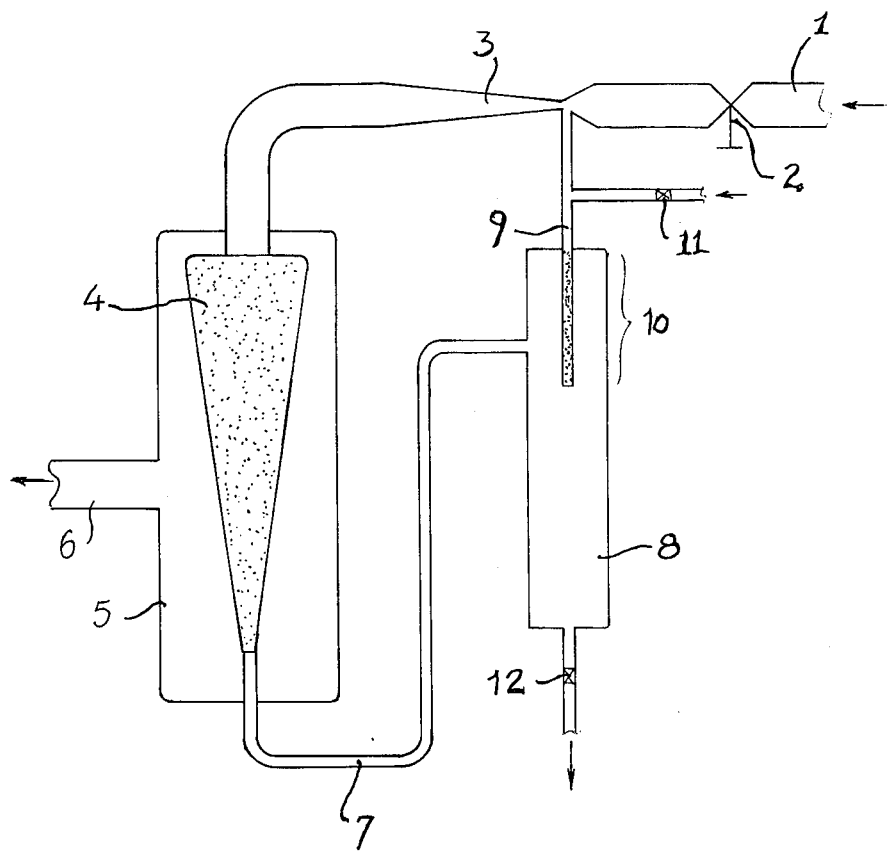

3

FILTER FOR USE WITH IRRIGATION SYSTEMS

BACKGROUND OF INVENTION

In irrigation systems the water used for irrigation purposes frequently carries with it foreign matter such as grains of sand, small pieces of wood, parts of plants, algae and the like. This material is apt to stop and block the delicate mechanism of some of the used sprinkler devices or part of other irrigation systems.

The likelihood of blocking of flow is even more serious in drip irrigation systems where the blocking of one outlet might interfere with the proper function of the whole system.

It is therefore customary to pass the irrigation water through filters before it reaches the respective water dispensing means, be these sprinklers or other outlet ports of drip or other irrigation devices.

The filtering devices obviously accumulate, during the period of use, considerable quantities of matter and above all the screening means of the filter become clogged so that the filter becomes useless. It has been suggested therefore to provide certain screening filters which perform the cleaning operation mostly by mechanical means, such as brushes combined with periodical flushing.

Such arrangements are rather complicated, they are not sufficiently reliable and increase the cost of the irrigation system considerably.

OBJECT OF INVENTION

It is the object of the present invention to provide a filter which is practically self-cleaning and which does not comprise any mechanical or moving parts and is therefore reliable in function and relatively inexpensive as an initial investment in irrigation system.

SHORT SUMMARY OF INVENTION

According to the invention, there is provided a filter comprising a hollow screening and filtering body having an inlet and an outlet, a Venturi pipe being provided in communication with the said hollow screening and filtering body, said screening and filtering body being accommodated in a casing having an outlet, a first conduit leading from the interior of the said hollow screening and filtering body into a container from the interior of which a second conduit leads to a point substantially co-incident with the throat of the Venturi pipe, the said second conduit being closed at its end which is within the said container, the end portion of said second conduit - so far as it extends within the container - being permeable to liquid, the said container being provided with flushing inlets and outlets.

SHORT DESCRIPTION OF DRAWING

The annexed drawing shows in a single schematical FIGURE the arrangement of a filter according to the invention.

DESCRIPTION OF PREFERRED EMBODIMENT

Through an inlet pipe 1, in which is provided a shut-off valve 2, unclean, unfiltered water is admitted into a Venturi pipe 3, from which it flows into a hollow, conical filtering body 4. This filtering body 4 is accommodated in a case 5, from which an outlet 6 leads into the irrigation pipes or devices.

The filtering body 4 is made of filtering material of any kind such as layers of gauze, ceramic material, plastics and the like, or any other material conventionally used as filter material.

The filtering body 4 is of upwardly flaring shape and from its narrowest lowermost part a conduit 7 leads into a container 8. In the container 8 and upwardly out of it extends a vertical pipe 9, the lower end of which is closed and the stretch of which within the container 8 is permeable as indicated at 10. The uppermost end of pipe 9 leads into the Venturi 3, at the narrowest part of the throat thereof. Into the conduit 9, intermediate the container 8 and the Venturi 3 leads a pipe 11. There is also provided a pipe 12, leading from the container 8 into the open.

The new arrangement functions as follows: unclean water enters the conduit 1 and flows into the Venturi 3 and into the hollow filtering body 4. Filtered water percolates out of body 4 into the casing 5 from which it flows through the conduit 6 into the irrigation system.

Water, now containing a greater percentage of foreign matter in the hollow body 4, flows through conduit 7 into the container 8.

In this container sedimentation of foreign matter takes place which partly sinks to the bottom of the container, and partly floats on the water within the container 8. The Venturi pipe 3 exerts suction on conduit 9 so that clean, filtered water which percolates through the permeable wall of the conduit 9. Part of this water now joins the main flow entering the Venturi pipe 3 to be carried into the filtering body 4, thus completing the circulation.

It can be seen that the outlet 6, leading into the irrigation system, clean water, carrying no foreign matter is available. The foreign matter is retained in the filtering body 4. This — however, is continually flushed by the flow entering into the filtering body 4 via Venturi 3, and sediment is carried via conduit 7 into the container 8.

The unfiltered foreign matter which sediments at container 8 and is retained in the latter is flushed out from time to time by having flushing water enter through inlet 11 and exit from the container 8 through the outlet 12. There is no need to shut off the apparatus by closing valve 2, during flushing. This flushing will become necessary at certain intervals, depending upon the percentage of foreign matter carried by the water.

The conical shape of part 4 is preferable being most effective, since water velocity is kept constant or increased through it, depending on the ratio between its two end faces, the distance between them and the porosity of its walls.

What is claimed is:

1. A filtering system comprising a hollow screening and filtering body having an inlet and an outlet, a Venturi pipe being provided in communication with the said hollow screening and filtering body, the said screening and filtering body being accommodated in a casing having an outlet, a first conduit leading from the interior of the said hollow screening and filtering body into a container from the interior of which a second conduit leads to a point co-incident with the throat of the Venturi pipe, the said second conduit being closed at its end which is within the said container, the end portion of said second conduit — so far as it extends within the container — being permeable to liquid, the said container being provided with flushing inlets and outlets.

2. The filtering system according to claim 1 characterised thereby that the said filtering body is conical.

* * * * *